March 29, 1966 K. BOKE 3,242,680

DEVICE FOR SUPPRESSING THE THERMAL BACKFLOW FROM A HEAT-EXCHANGER TO THE COOLING SPACE OF A COOLING DEVICE EQUIPPED ESPECIALLY WITH A THERMO-ELECTRIC COOLING ELEMENT

Filed May 28, 1964 2 Sheets-Sheet 1

INVENTOR.
KLAUS BOKE
BY
Frank R. Jeffrey
AGENT

INVENTOR.
KLAUS BOKE
BY
Frank R. Jinfani
AGENT

United States Patent Office 3,242,680
Patented Mar. 29, 1966

3,242,680

DEVICE FOR SUPPRESSING THE THERMAL BACKFLOW FROM A HEAT-EXCHANGER TO THE COOLING SPACE OF A COOLING DEVICE EQUIPPED ESPECIALLY WITH A THERMO-ELECTRIC COOLING ELEMENT

Klaus Boke, Brand, Germany, assignor to North American Philips Company, Inc., New York, N.Y., a corporation of Delaware Filed May 28, 1964, Ser. No. 371,063
Claims priority, application Germany, June 22, 1963, P 21,791
3 Claims. (Cl. 62—3)

This invention relates to devices for suppressing the thermal backflow from a heat-exchanger to the cooling space of a cooling device equipped especially with a thermo-electric cooling element and having heat-dissipating parts from which thermal energy may be extracted by means of a flowing medium, after the cooling device is put out of operation.

As is well-known, thermo-electric cooling elements give off not only cold energy but also heat energy, which is dissipated by means of a heat-exchanger. However, the operation of the heat-exchanger reverses for a certain period when the device is switched off, for example, upon reaching the desired temperature in the space to be cooled. From this moment the heat-exchanger gives the heat energy which is still stored in it and which has previously been dissipated from the side, back to the cooling element. A thermal backflow to the cold side of the cooling element thus results which counteracts the cooling proper and thus makes the efficiency of the total arrangement less satisfactory.

It is known to avoid this disadvantage in cooling devices equipped with thermo-electric cooling elements by extracting the heat-exchanging liquid from the heat-exchanger upon switching off. In this case, there is no thermal backflow since the heat-exchanger no longer stores heat energy after switching off.

The removal of the liquid from the heat-exchanger is laborious, however, and requires the use of additional equipment.

According to the invention the disadvantage of the known device for suppressing the thermal backflow from a heat-exchanger to the cooling space of a cooling device equipped especially with a thermo-electric element, after the cooling device is switched off, is avoided by means of one or more thermally insulating closure members which can close, at the moment of switching off, the flow channel or channels leading the heat-exchanging medium, preferably a liquid of low specific heat such as mercury or chloroform, along the parts of the cooling element giving off heat. The thermal insulating closure members are preferably valves included in the inlet and outlet channels and made from synthetic material at the areas of contact with the medium.

By means of the valves, the flow of medium is stopped at the moment of switching off. A small proportion of the heat-exchanging medium, which is preferably a liquid of low specific heat, thus further contacts with the hot side of the thermo-electric cooling element. However, since the amount of heat-exchanging liquid which remains in contact with the side is small, the heat energy stored in it is not sufficient to cause any appreciable thermal backflow to the cold side of the cooling element. A thermal backflow can neither take place via the liquid which still stands in the pipes since the thermal contact of the liquid columns is interrupted at the valves.

In order that the invention may be readily carried into effect, it will now be described in detail, by way of example, with reference to one embodiment shown in the accompanying diagrammatic drawings, in which.

Figure 1:
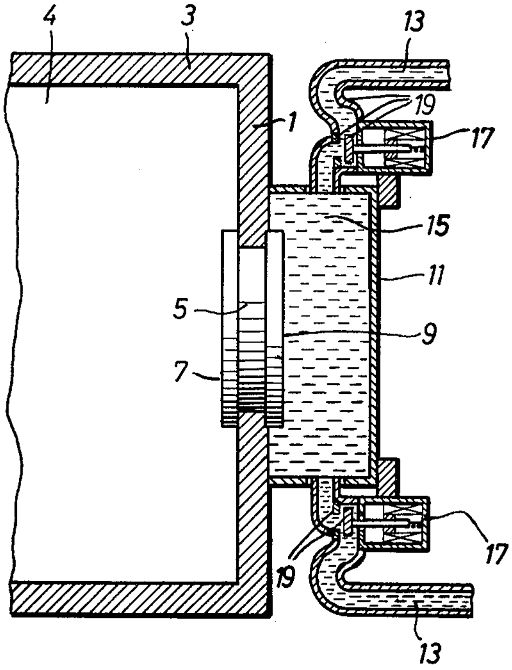
FIGURE 1 shows a device according to the invention having sliding valves.

A thermo-electric cooling element 5 is placed in a wall 1 of a cooling container 3 shown in FIGURE 1. A surface 7 of the cooling element 5, which gives off cold, is located on the inner side of the wall 1 and thus cools the interior of the cooling container. Another surface 9 of the cooling element 5, which radiates heat energy, is located on the outer side of the wall 1 and is surrounded by a heat-exchanging vessel 11 of as small a volume as possible, which is likewise arranged on the outer side. The vessel 11 has inlet and outlet tubes 13 for a cooling liquid 15.

Within the inlet and outlet, the tubes 13 are provided with electromagnetic sliding valves 17 which can be made operative and inoperative together with a pump (not shown) for circulating the cooling liquid 15 and operating the thermo-electric cooling element 5. To prevent thermal contact of the liquid through the valves 17, portions 19 thereof which are a valve and valve seat respectively that make contact with the cooling liquid are made from synthetic material. When the whole of the arrangement is switched on, the magnetic valves 17 open the tubes 13 and thus allow the cooling liquid to pass along the heat-dissipating side 9 of the thermo-electric cooling element. The liquid 15 thus dissipates the heat absorbed by the surface 9 from the cooling element 5 whereas the surface 7 on the cold side of the cooling element gives off cold energy to the cold space 4.

When the temperature in the cooling space 4 has fallen off to a desired value the cooling element 5 is switched off by means of a thermostat (not shown). Upon switching off, the circulation pump is also stopped and the magnetic valves 17 automatically closed. The liquid flow is thus abruptly interrupted and as a result the heat exchange also discontinues. Due to the storage of liquid and hence of heat being only small because of the small volume in the vessel 11 there is no noticeable thermal backflow from the hot side 9 of the cooling element 5 into this cooling element.

Figure 2:
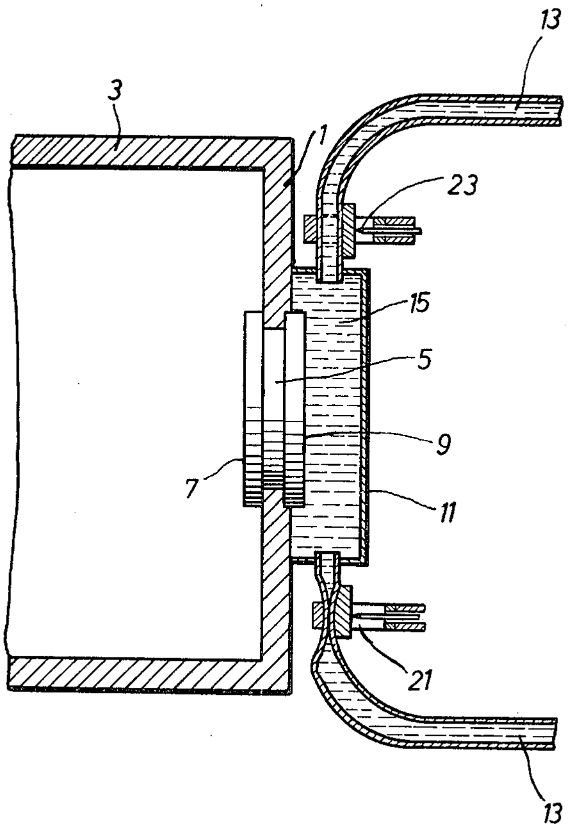
FIGURE 2 shows a device having snap valves.

In a modified arrangement as shown in FIGURE 2, the sliding valves 17 are replaced by simple snap valves 21, 23. Such snap valves 21, 23 are especially suitable because of the fact that the tubes 13 connecting the vessel 11 and the heat-exchanger preferably already consist of deformable tubings and these tubings need only be provided with snap pinching devices at the closure areas desired. All the valve portions which contact the cooling liquid 15 thus consist in themselves of synthetic material in so far as synthetic materials are used and have a thermally insulating action for the liquid columns if the synthetic material is thermally insulating. The snap devices of the valves 21, 23, like the sliding valves 17, are operated electromagnetically. For better understanding of the operation the valve 21 is shown in the closed condition and the valve 23 in the open condition. However, both valves are actually open or closed simultaneously.

What is claimed is:

1. A device for suppressing the thermal backflow to a thermo-electric cooling element connected to a cooling container and having both heat dissipating and heat absorbing parts whereby thermal energy may be extracted by means of a flowing heat exchanging medium, comprising a flow channel of relatively small area leading said heat exchanging medium along said heat dissipating parts of said cooling element whereby the heat in said heat absorbing parts is dissipated to said flow channel, inlet and outlet tubes for said heat exchanging medium communicating with said flow channel, and at least one thermally insulated closure member for closing off the flow channel when said cooling element has stopped operating.

2. A device as claimed in claim 1 wherein said thermally insulated closure member is a valve and valve seat respectively which are constituted of synthetic material.

3. A device as claimed in claim 1 wherein said valves are sliding valves.

References Cited by the Examiner

UNITED STATES PATENTS

| | | | |
|---|---|---|---|
| 2,908,476 | 10/1959 | Hidding | 251—368 |
| 2,928,253 | 3/1960 | Lopp | 62—3 |
| 2,932,953 | 4/1960 | Becket | 62—3 |
| 3,054,840 | 9/1962 | Alsing | 62—3 |
| 3,099,429 | 7/1963 | Broman | 251—368 |
| 3,112,759 | 12/1963 | DeLucia | 251—368 |
| 3,139,734 | 7/1964 | Kuchens | 62—3 |

WILLIAM J. WYE, *Primary Examiner.*